(12) United States Patent
Sesek

(10) Patent No.: US 8,346,842 B2
(45) Date of Patent: Jan. 1, 2013

(54) REFORMATTING DYNAMICALLY REROUTED PRODUCTION REQUESTS

(75) Inventor: Robert Sesek, Meridian, ID (US)

(73) Assignee: Hewlett-Packard Development Company L.P., Houston, TX (US)

( * ) Notice: Subject to any disclaimer, the term of this patent is extended or adjusted under 35 U.S.C. 154(b) by 3191 days.

(21) Appl. No.: 10/186,057

(22) Filed: Jun. 27, 2002

(65) Prior Publication Data
US 2004/0003035 A1      Jan. 1, 2004

(51) Int. Cl.
*G06F 15/16* (2006.01)
(52) U.S. Cl. ........................................ 709/200
(58) Field of Classification Search .................. 709/200, 709/206
See application file for complete search history.

(56) References Cited

U.S. PATENT DOCUMENTS 5,359,694 A * 10/1994 Concordel .................... 358/445
5,625,757 A    4/1997 Kageyama et al.
2003/0090697 A1 * 5/2003 Lester et al. ................. 358/1.14
2003/0184782 A1 * 10/2003 Perkins et al. ............... 358/1.13
2004/0205621 A1 * 10/2004 Johnson et al. ............... 715/523

FOREIGN PATENT DOCUMENTS

| EP | 0 790 548 A1 | 8/1997 |
| EP | 1 103 887 A1 | 5/2001 |
| GB | 2 368 488 A | 5/2002 |
| JP | 2001071590 A | 3/2001 |

OTHER PUBLICATIONS

Office Action, European Application No. 03253560.1, Date: Oct. 26, 2012, pp. 1-7.

* cited by examiner

*Primary Examiner* — John Follansbee
*Assistant Examiner* — Glenford Madamba

(57) ABSTRACT

Automatically reformatting rerouted production requests so that a production request directed to one production device can be rerouted to another device with little if any user intervention. A method embodying the present invention includes queuing a production request formatted for a primary production service. Upon detection of a redirection event for the primary production service, an available secondary production service is identified. The production request is reverted and then reformatted specifically for the secondary production service.

16 Claims, 4 Drawing Sheets

REFORMATTING DYNAMICALLY REROUTED PRODUCTION REQUESTS

FIELD OF THE INVENTION

The present invention is directed to document production, and, more particularly, to automatically reconfiguring dynamically rerouted production requests.

BACKGROUND OF THE INVENTION

In a basic desktop computing environment, a printer or other document production device is connected directly or indirectly via a network to a computer. To produce a document, a user either opens or creates an electronic document using a word processor or other application. The user then selects a production icon or enters a production command causing the application or other programming to present an interface enabling the user to select a production service such as a printer. With the production service selected, a driver specific to the selected production service—a printer in this example—generates an interface allowing the user to select production settings for utilizing the features of the selected production device. Among others, these features can include the ability to produce a specified number of copies, to print at a specified resolution, and to utilize specified paper source and output bins. With the desired settings selected, the driver formats the production request into a specialized series of commands directing the printer to produce the document on one or more sheets of paper.

In a more complex environment, the computer and production services are components of a larger network of hardware and programming. When issuing a production request, the user is prompted to select a particular production service available to that user on the network. With the service selected, the process continues as above. However, more than one user may direct a production request to a given service. Because a production service such as a printer can only produce one document at a time, multiple requests simultaneously directed to a single production service are stored in a central queue. The queued requests are released one at a time as the production service becomes available.

Periodically, a production service becomes inoperable. For example, a printer may run out of paper or imaging material such as toner or ink. Production requests are then held in the queue until the service becomes available. For some requests, timely production can be critical. When printing a postage label for a parcel or letter, the user often times will be inconvenienced by any significant delays.

When an important production request is delayed, the user may choose to delete the request from the queue and direct the production request to an operable service. Alternatively, programming managing the queue may automatically reroute the original production request to an operable production service. In either case, significant user intervention is required when production settings selected for the inoperable production service are not supported by the operable production service. As an example, a user desiring to print a postage label directs a production request to a printer capable of producing fluorescent franking. When that device is rendered inoperable, some form of user intervention is required to produce the same label on another device not capable of fluorescent franking.

SUMMARY

Accordingly, the present invention involves automatically reformatting rerouted production requests, so a production request directed to one production device can be rerouted to another device with little if any user intervention. A method embodying the present invention includes queuing a production request formatted for a primary production service. Upon detection of a redirection event for the primary production service, an available secondary production service is identified. The production request is reverted and then reformatted specifically for the secondary production service.

DETAILED DESCRIPTION

Figure 1:
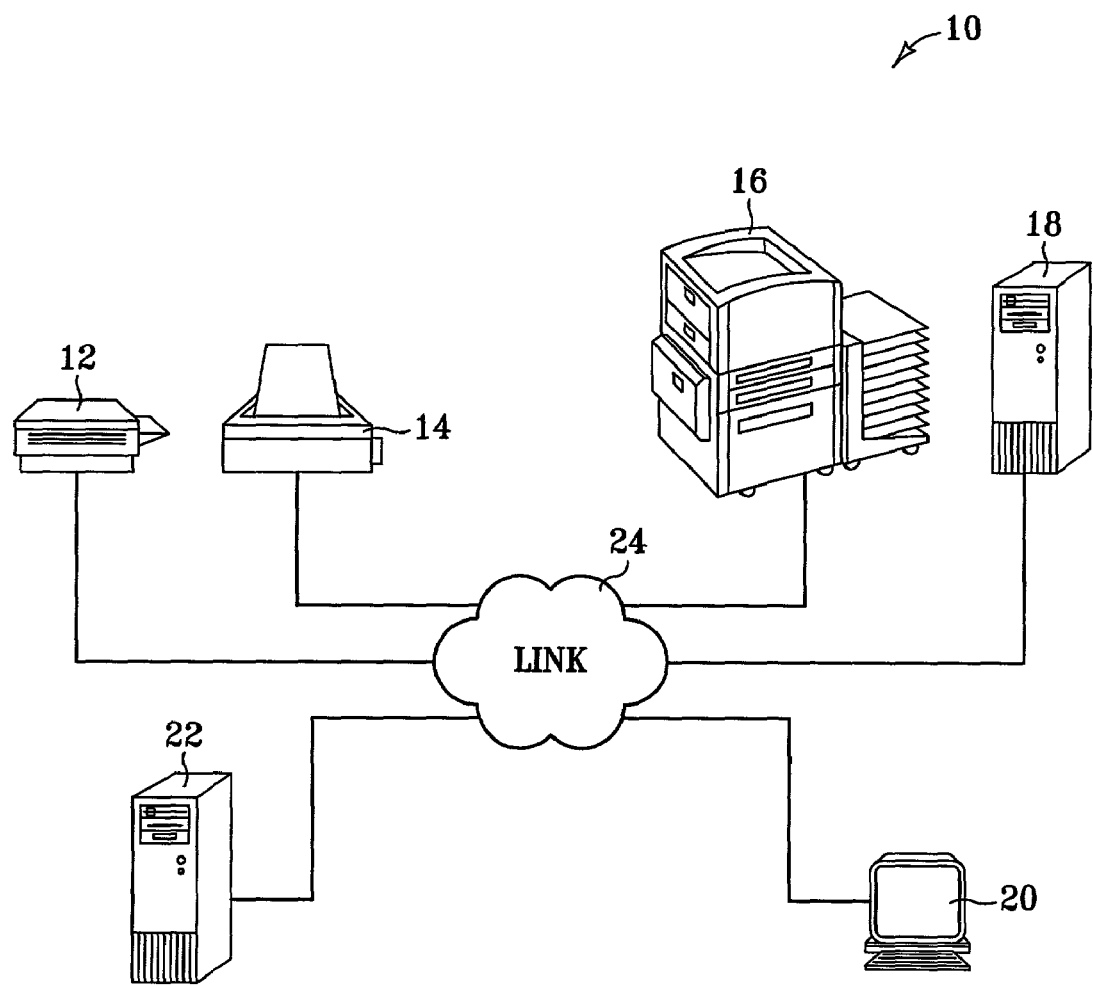
FIG. 1 is a schematic diagram illustrating a document production network in which embodiments of the present invention may be incorporated.

Glossary:

Electronic Document: Any data representing an image. The image can be comprised of a number of elements including text and/or graphics.

Production Service: Any combination of hardware and/or programming capable of producing a document. Examples include printers and finishers such as folders, binders, staplers, and the like. Also included are e-mail clients, facsimile hardware and software, and programming capable of archiving documents.

Production Request: Instructions for producing a document, typically issued by an application such as a word processor under the direction of a user. A production request can be generic or formatted. When issued by the application, the request is generic. Once a specific production service and production options for that service are selected, a driver specific to the selected service formats the production request so the request can directed to and processed by the selected production service.

Production Settings: Instructions guiding the use of features offered by a production service. For example, features for a printer may include the ability to print a user specified number of copies, to print at a specified resolution, to use paper from a specified input tray, and to direct the printed pages of a document to a specified output bin. Features of an e-mail client may include to electronically send a document to a user specified mailing list. These examples of features are in no means all inclusive. As technology develops, more and more production services will become available each providing ever increasing numbers and types of features.

INTRODUCTION: In a computing environment, a user employs a client to open or create an electronic document using an application such as a word processor. To issue a production request, the user then selects a production icon or enters a production command causing the application or other programming to present an interface enabling the user to select a production device. With the production device selected, a driver specific to the selected production device—a printer in this example—generates an interface allowing the user to select production settings for utilizing features provided by the selected production service. With the desired options selected, the driver formats the production request into a specialized series of commands directing the selected production service to produce the document. Where the selected production service is inoperable or otherwise unavailable in a timely fashion, it is expected that various embodiments of the present invention will allow the production request to be rerouted and reconfigured to a format compatible with another production service.

Although the various embodiments of the invention disclosed herein will be described with reference to the computer network 10 shown schematically in FIG. 1, the invention is not limited to use with network 10. The invention may be implemented in or used with any computer system in which it is necessary or desirable to produce documents. The following description and the drawings illustrate only a few exemplary embodiments of the invention. Other embodiments, forms, and details may be made without departing from the spirit and scope of the invention, which is expressed in the claims that follow this description.

Referring to FIG. 1, computer network 10 represents generally any local or wide area network in which a variety of different electronic devices are linked. Network 10 includes production services 12-18, computer 20, and production server 22. As illustrated, production service 12 is a laser printer, production service 14 is a tractor feed printer, production service 16 is a combination printer and finishing device, and production service 18 is programming such as an e-mail client or facsimile software operating on a server. However, production services 12-18 need not be as illustrated. Moreover, network 10 may include any number of production services. Computer 20 represents any combination of hardware and/or programming enabling a user to issue a production request for a document. Production server 22 represents any combination of hardware and/or programming capable of managing production requests on behalf of production services 12-18.

Link 24 interconnects production services 12-18, computer 20, and production server 22 and represents generally a cable, wireless, or remote connection via a telecommunication link, an infrared link, a radio frequency link, or any other connector or system that provides electronic communication between the components 12-22 of network 10. Link 24 may represent an intranet, the Internet, or a combination of both. The components 12-22 of network 10 can be connected to network 10 at any point and the appropriate communication path established logically between the components 1222.

Figure 2:
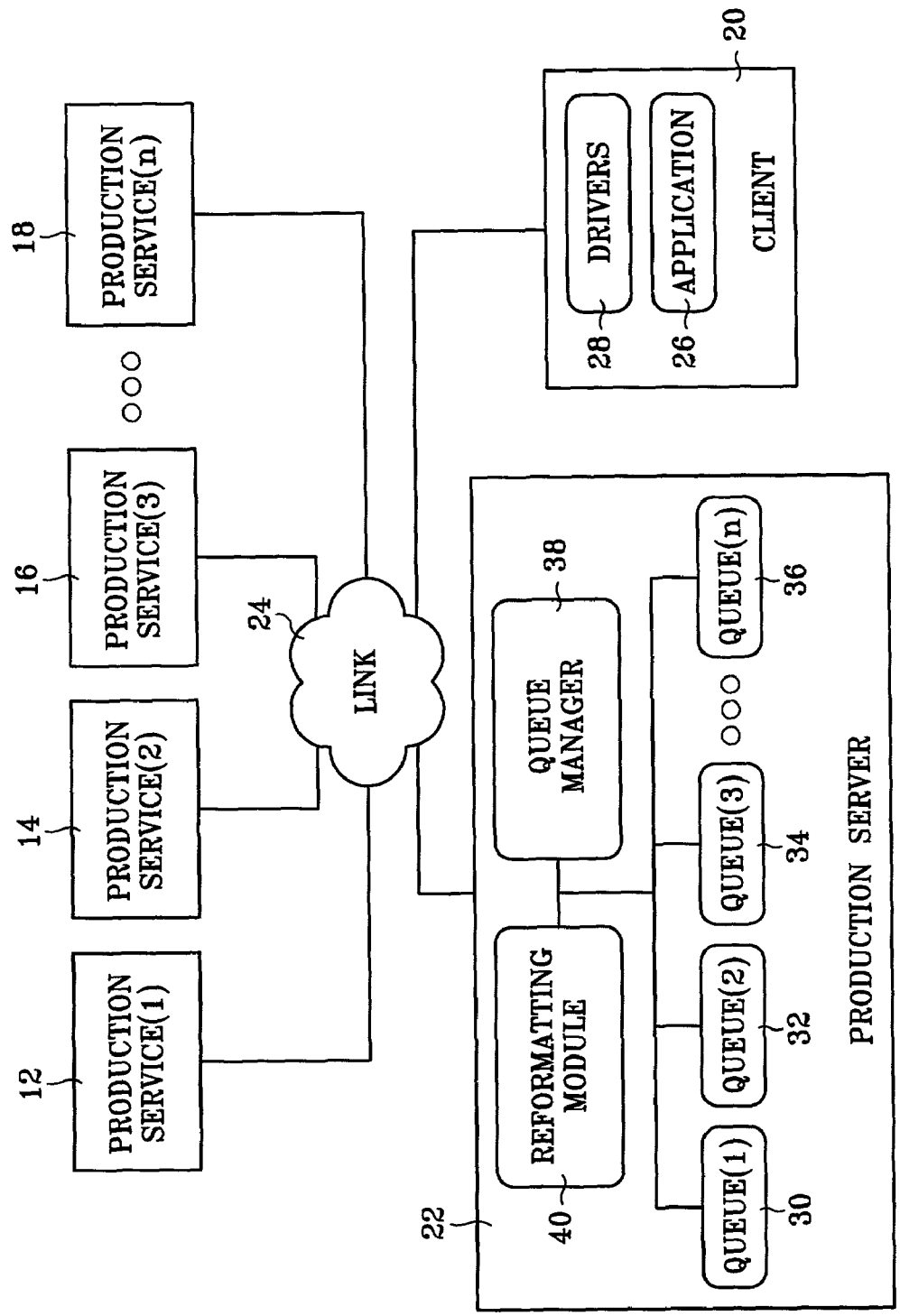
FIG. 2 is a block diagram illustrating the logical components of a production server and a client according to an embodiment of the present invention.

COMPONENTS: FIG. 2 illustrates the logical programming elements of production server 22 and computer 20. Computer 20 includes application 26 and drivers 28. Application 26 represents generally any programming capable of generating, modifying, or retrieving an electronic document as well as issuing a production request for that document. Drivers 28 represent generally any programming capable of formatting a production request into a specialized series of commands enabling one or more of production services 12-18 to produce a document.

Production server 22 includes queues 30-36 with each queue being associated with a particular production service 12, 14, 16, or 18. Each queue 30-36 represents generally an electronic holding bin capable of containing production requests directed to a particular production service 12, 14, 16, or 18. When multiple production requests are simultaneously directed to the same production service, production service 12 for example, those requests are placed in queue 30 and are released one at a time as production service 12 becomes available.

Production server 22 also includes queue manage 38 and reformatting module 40. Queue manager 38 represents generally any programming capable of managing production requests within queues 30-36. More particularly, queue manager 38 is responsible for intercepting a print request directed to a particular production service 12, 14, 16, or 18 and placing that request in the queue 30, 32, 34, or 36 associated with that production service 12, 14, 16, and 18. As that production service 12, 14, 16, or 18 becomes available, queue manager 38 is responsible for releasing production requests from the queue 30, 32, 34, or 36 associated with that production service. Queue manager 38 is also responsible for detecting redirection events. A redirection event occurs when a production service for whatever reason, becomes inoperable or otherwise unavailable and is unable to accept production requests in a timely manner. Upon detection of a redirection event for a given production service 12, 14, 16, or 18, queue manager 38 is responsible for identifying another production service or services capable of producing the document. Reformatting module 40 represents generally any programming capable of receiving a production request formatted for one production service 12, 14, 16, or 18 and reformatting that production request for a different production service 12, 14, 16, or 18.

Figure 3:
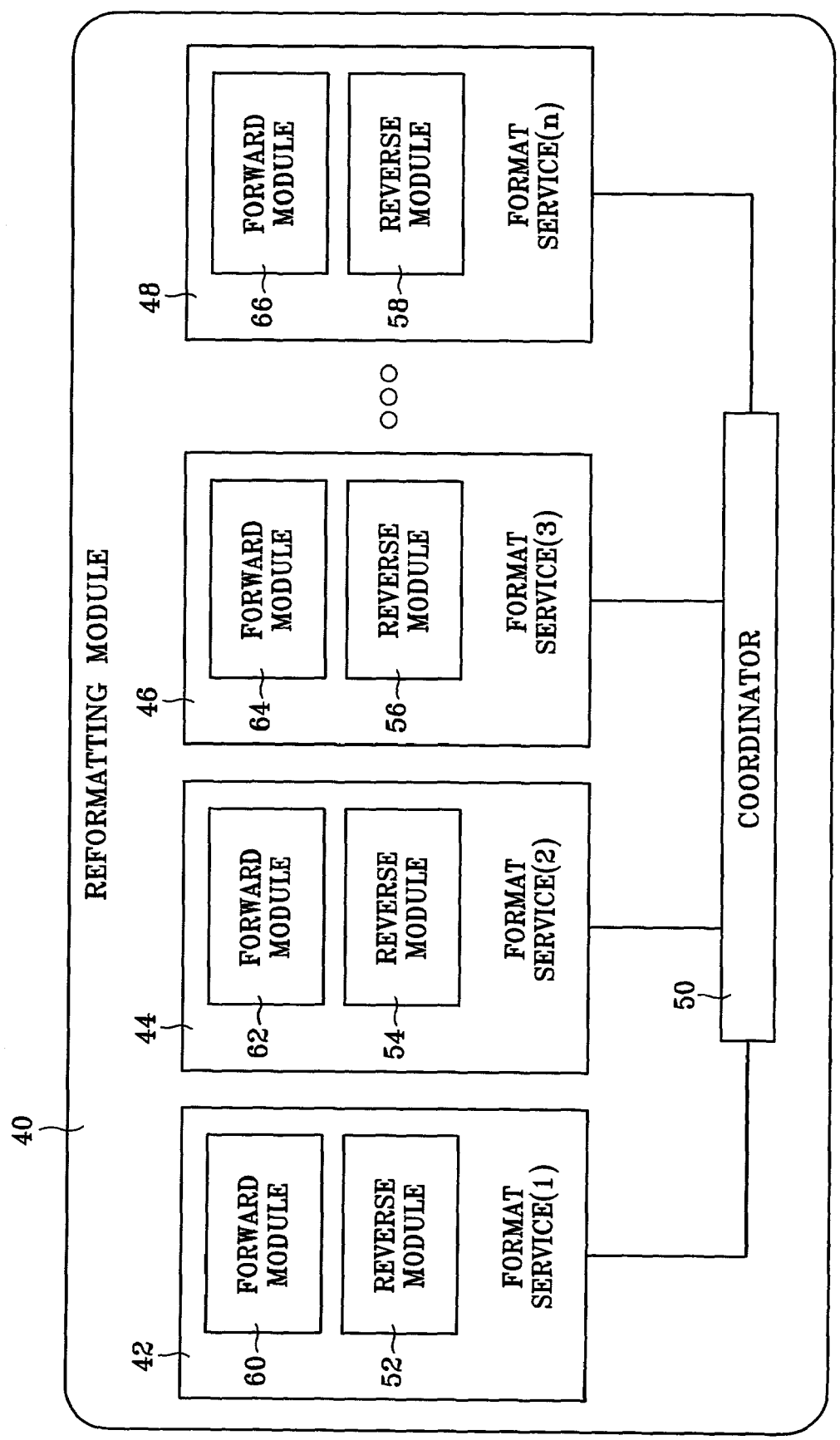
FIG. 3 is a block diagram illustrating the logical components of a reconfiguration module according to an embodiment of the present invention.

Referring now to FIG. 3, reformatting module 40 includes format services 42-48—each format service being associated with a particular production service 12, 14, 16, or 18—and coordinator 50. Format services 42-48 include reverse modules 52-58 and forward modules 60-66. Reverse module 52, 54, 56, or 58 for a given format service 42, 44, 46, or 48 represents generally any programming capable of reverting, to a generic format, a production request specifically formatted for the production service 12, 14, 16, or 18 with which that format service 42, 44, 46, or 48 is associated. Forward module 60, 62, 64, or 66 for a given format service 42, 44, 46, or 48 represents generally any programming capable of formatting a reverted production request for a production service 12, 14, 16, or 18 with which that format service 42, 44, 46, or 48 is associated.

Coordinator 50 represents generally any programming capable of serving at least the following two functions. First, upon receiving a redirected production request from queue manager 38, it is capable of sending the redirected request to the format service 42, 44, 46, or 48 associated with the production service 12, 14, 16, or 16 to which the production request was originally directed. Second, upon receiving a reverted production request from a service 42, 44, 46, or 48, it is capable of sending the reverted request to the format service 42, 44, 46, or 48 associated with the production service 12, 14, 16, or 18 to which the production request is being redirected.

While FIG. 2 shows reformatting module 40, queue manager 38, and queues 20-36 as being present on a single device—production server 22, those elements may just as well be separates across two or more devices. Those devices need only be able to communicate with one another over link 24. Moreover, the various elements of Reformatting module 40 may, shown in FIG. 3, may be separated across two or more devices. For example, each format service 42-48 may actually be located on a different production service 12-18.

The block diagrams of FIGS. 2 and 3 show the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s).

Also, the present invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that contains, stores, or maintains programming for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as a floppy diskette or hard drive, a random access memory (RAM), a read-only memory (ROM), an erasable programmable read-only memory, or a portable compact disc.

OPERATION: The operation of a method embodying the present invention will now be described with reference to the flow diagram of FIG. 4. Initially a user directs application 26 to cause an electronic document to be produced by a primary production service (step 67). A primary production service is a production service 12, 14, 16, or 18 that a user has selected to produce the document. Application 26 issues a production request for the document, and drivers 28 format the production request for the primary production service (Step 68). The formatted production request is then directed from computer 20 to the primary production service (step 70). Queue manager 38 intercepts and places the request in a queue 30, 32, 34, or 36 associated with the primary production service (step 72).

Queue manager 38 monitors the status of the primary production service and for whatever reason, detects a redirection event (step 74). Queue manager 38, then, identifies an available secondary production service (step 76). A secondary production service is a production service 12, 14, 16, or 18 that, while not selected by the user, is capable of handling the production request. Queue manager 38 redirects the production request through reformatting module 40 to the identified secondary production service (step 78). Because the production request has been formatted specifically for the primary production service, it must be reformatted for the secondary production service.

Coordinator 50 receives the redirected production requests and sends it to the format service 42, 44, 46, or 48 associated with the primary production service. The reverse module 52, 54, 56, or 58 for that format service reverts the production request (step 80). A reverted production request includes generic data representing the document to be produced as well as generic data identifying the production settings, if any, selected for the primary production service. This generic data can be interpreted and reformatted by any format service 42, 44, 46, and/or 48. Coordinator 50 sends the reverted production request to the format service 42, 44, 46, or 48 associated with the secondary production service. The forward module 60, 62, 64, or 66 for that format service reformats the reverted production request for the secondary production service (step 82).

It is expected that situations will arise in which production settings selected for the primary production service are not supported by the secondary production service. In these cases forward module 60, 62, 64, or 66 identifies for the secondary production service the most compatible production settings. For example, production settings selected for the primary production service may have directed printing at a resolution of 1,200 dpi (dots per inch). The secondary production service may be only capable of printing at 900 dpi—the most compatible production setting. Forward module 60, 62, 64, or 66 then formats the production request so that it will direct printing at 900 dpi.

Coordinator 50 then returns the reformatted production request to queue manager 38 (step 82) which in turn places the request in the queue 30, 32, 64, or 36 associated with the secondary production service (step 84). When the secondary production service becomes available, queue manager 38 delivers the production request to the secondary production service (step 86).

Figure 4:
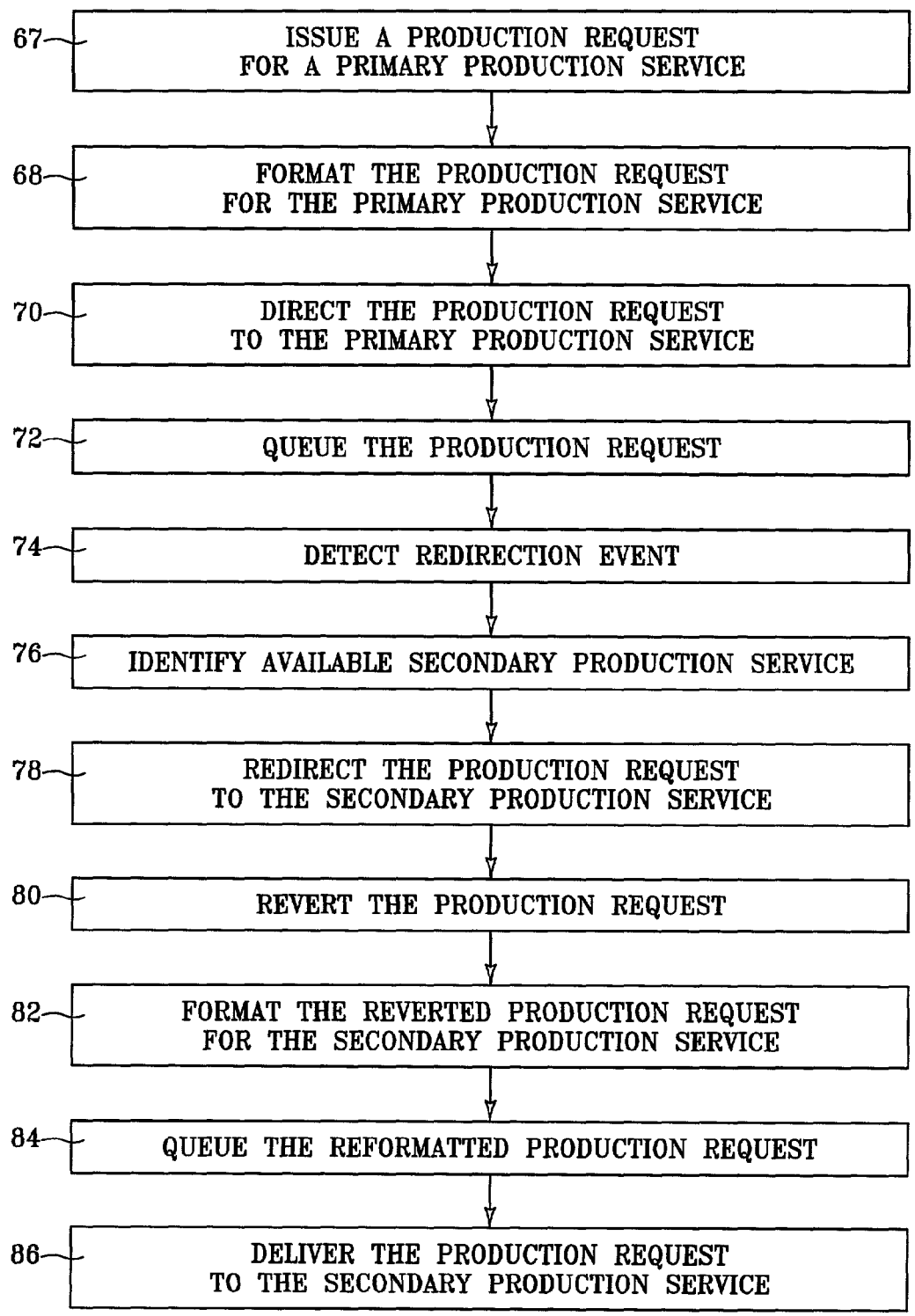
FIG. 4 is a flow chart illustrating a method according to the present invention for reformatting a dynamically rerouted production request.

Although the flow chart of FIG. 4 shows a specific order of execution, the order of execution may differ from that which is depicted. For example, the order of execution of two or more blocks may be scrambled relative to the order shown. Also, two or more blocks shown in succession in FIG. 5 may be executed concurrently or with partial concurrence. All such variations are within the scope of the present invention.

The present invention has been shown and described with reference to the foregoing exemplary embodiments. It is to be understood, however, that other forms, details, and embodiments may be made without departing from the spirit and scope of the invention, which is defined in the following claims.

What is claimed is:

1. A method, comprising:
    queuing a production request formatted for a primary production service;
    detecting a redirection event for the primary production service;
    identifying an available secondary production service;
    reverting the production request; and
    reformatting the production request for the secondary production service.

2. The method of claim 1, wherein reverting comprises reverting the production request into data representing a document to be produced and data representing production settings for the primary production service, and wherein reformatting comprises identifying production settings for the secondary production service that are most compatible with the production settings for the primary production service and reformatting the reverted production request according to the identified production settings.

3. A method for reformatting a dynamically rerouted production request, comprising:
    issuing a production request for a primary production service;
    formatting the production request for the primary production service;
    queuing the production request;
    detecting a redirection event for the primary production service;
    identifying an available secondary production service;
    reverting the production request; and
    reformatting the production request for the secondary production service.

4. The method of claim 1, wherein reverting comprises reverting the production request into data representing a document to be produced and data representing production settings for the primary production service, and wherein reformatting comprises identifying production settings for the secondary production service that are most compatible with the production settings for the primary production service and reformatting the reverted production request according to the identified production settings.

5. A method for reformatting a dynamically rerouted production request, comprising:
- issuing a production request for a primary production service;
- formatting the production request for the primary production service;
- queuing the production request;
- detecting a redirection event for the primary production service;
- identifying an available secondary production service;
- reverting the production request into data representing a document to be produced and data representing production settings for the primary production service;
- identifying production settings for the secondary production service that are most compatible with the production settings for the primary production service; and
- reformatting the reverted production request for the secondary production service according to the identified production settings.

6. Computer readable media having instructions for:
- queuing a production request formatted for a primary production service;
- detecting a redirection event for the primary production service;
- identifying an available secondary production service;
- reverting the production request; and
- reformatting the production request for the secondary production service.

7. The media of claim 6, wherein the instructions for reverting comprise instructions for reverting the production request into data representing a document to be produced and data representing production settings for the primary production service, and wherein the instructions for reformatting comprise instructions for identifying production settings for the secondary production service that are most compatible with the production settings for the primary.

8. Computer readable media having instructions for:
- issuing a production request for a primary production service;
- formatting the production request for the primary production service;
- queuing the production request;
- detecting a redirection event for the primary production service;
- identifying an available secondary production service;
- reverting the production request; and
- reformatting the production request for the secondary production service.

9. The media of claim 8, wherein the instructions for reverting comprise instructions for reverting the production request into data representing a document to be produced and data representing production settings for the primary production service, and wherein the instructions for reformatting comprise instructions for identifying production settings for the secondary production service that are most compatible with the production settings for the primary.

10. Computer readable media having instructions for:
- issuing a production request for a primary production service;
- formatting the production request for the primary production service;
- queuing the production request;
- detecting a redirection event for the primary production service;
- identifying an available secondary production service;
- reverting the production request into data representing a document to be produced and data representing production settings for the primary production service;
- identifying production settings for the secondary production service that are most compatible with the production settings for the primary production service; and
- reformatting the reverted production request for the secondary production service according to the identified production settings.

11. In a network of production services, a system for dynamically rerouting and reformatting production requests, comprising:
- a first format service associated with a first production service operable to revert a production request previously formatted for the first production service;
- a second format service associated with a second production service operable to reformat a reverted production request specifically for the second production service; and
- a coordinator operable to receive a production request redirected from the first production service to the second production service, to direct the first format service to revert the production request and to direct the second format service to reformat the production request.

12. The system of claim 11, wherein:
- the second format service is further operable to revert a production request previously formatted for the second production service;
- the first format service is further operable to reformat a reverted production request specifically for the first production service; and
- the coordinator is further operable to receive a production request redirected from the second production service to the first production service, to direct the second format service to revert the production request and to direct the first format service to reformat the production request.

13. In a network of at least two production services, a system for dynamically rerouting and reformatting production requests, comprising:
- a queue manager operable, for each production service, to manage a queue, to detect a redirection event for a primary production service, to identify a secondary production service, and to redirect a production request from the queue for the primary production service to a secondary production service;
- a format service associated with each production service, each operable to revert a production request formatted for a production service with which the particular format service is associated and to reformat a reverted production request for the production service with which the particular format service is associated; and
- a coordinator operable to direct a format service associated with the primary production service to revert a production request and to direct a format service associated with a secondary production service to reformat the production request.

14. The system of claim 13 wherein each format service includes a reverse module and a forward module, the reverse module being operable to revert a production request formatted for a primary production service and the forward module being operable to format a reverted production request for an identified secondary production service.

15. A system for dynamically rerouting and reformatting production requests, comprising:
- a primary production service;
- a secondary production service;

a queue manager operable, for each production service, to manage a queue, and upon detection of a redirection event for the primary production service, to redirect a production request from the queue for the primary production service to the secondary production service;

a first format service associated with the primary production service operable to revert a production request previously formatted for the primary production service;

a second format service associated with the secondary production service operable to reformat a reverted production request specifically for the secondary production service; and a coordinator operable to receive from the queue manager a production request redirected from the primary production service to the secondary production service, to direct the first format service to revert the production request and to direct the second format service to reformat the production request.

16. In a network of at least two production services, a system for dynamically rerouting and reformatting production requests, comprising:

a means for detecting a redirection event for a primary production service;

a means for identifying a secondary production service;

a means for redirecting a production request the primary production service to an identified secondary production service;

for each production service, a means for reverting a production request formatted for that production service;

for each production service, a means for reformatting a reverted production request for that production service; and a means for directing a means for reverting to revert a production request originally directed to the primary production service and to direct a means for reformatting to reformat the production request specifically for the secondary production service.

* * * * *